United States Patent
Scott et al.

[19]

[11] Patent Number: 6,046,858
[45] Date of Patent: Apr. 4, 2000

[54] LIGHT SEPARATION AND RECOMBINATION SYSTEM FOR AN OFF-AXIS PROJECTOR

[75] Inventors: Bradley A. Scott, Huntington Beach; William L. DeBoynton, Santa Ana, both of Calif.

[73] Assignee: Aurora Systems, Inc., San Jose, Calif.

[21] Appl. No.: 08/951,970

[22] Filed: Oct. 16, 1997

[51] Int. Cl.[7] .................................................. G02B 27/14
[52] U.S. Cl. ............................................................ 359/634
[58] Field of Search ..................................... 359/637, 634; 353/8, 34, 37; 348/750, 751, 757

[56] References Cited

U.S. PATENT DOCUMENTS

| | | | |
|---|---|---|---|
| 4,739,396 | 4/1988 | Hyatt ........................................ 358/60 |
| 4,796,978 | 1/1989 | Tanaka et al. .......................... 350/337 |
| 4,864,390 | 9/1989 | McKechnie et al. ..................... 358/60 |
| 4,935,656 | 6/1990 | Yamashita et al. ..................... 350/333 |
| 4,962,997 | 10/1990 | Baldwin ................................. 350/172 |
| 4,989,076 | 1/1991 | Owada et al. ............................ 358/61 |
| 5,012,274 | 4/1991 | Dolgoff ................................... 340/702 |
| 5,022,750 | 6/1991 | Flasck ...................................... 353/31 |
| 5,024,524 | 6/1991 | Flasck ...................................... 353/31 |
| 5,042,929 | 8/1991 | Tanaka et al. .......................... 359/708 |
| 5,060,058 | 10/1991 | Goldenberg et al. ..................... 358/60 |
| 5,075,798 | 12/1991 | Sonehara et al. ....................... 359/490 |
| 5,097,323 | 3/1992 | Sato et al. ................................. 358/60 |
| 5,098,183 | 3/1992 | Sonehara ................................. 353/31 |
| 5,105,265 | 4/1992 | Sato et al. ................................. 358/60 |
| 5,108,172 | 4/1992 | Flasck ...................................... 353/31 |
| 5,115,305 | 5/1992 | Baur et al. ................................. 358/60 |
| 5,181,054 | 1/1993 | Nicolas et al. ............................ 353/20 |
| 5,231,431 | 7/1993 | Yano et al. ............................... 353/31 |
| 5,239,322 | 8/1993 | Takanashi et al. ........................ 353/31 |
| 5,245,449 | 9/1993 | Ooi et al. .................................. 359/40 |
| 5,321,448 | 6/1994 | Ogawa ..................................... 353/34 |
| 5,386,306 | 1/1995 | Gunjima et al. .......................... 359/52 |
| 5,390,048 | 2/1995 | Miyatake et al. ....................... 359/650 |
| 5,400,180 | 3/1995 | Chung ..................................... 359/634 |
| 5,420,655 | 5/1995 | Shimizu ................................... 353/33 |
| 5,459,539 | 10/1995 | Yamamoto ............................. 353/119 |
| 5,467,146 | 11/1995 | Huang et al. ........................... 348/743 |
| 5,486,881 | 1/1996 | Hwang ..................................... 353/34 |
| 5,798,819 | 8/1998 | Hattori et al. ............................ 353/33 |
| 5,815,221 | 9/1998 | Kojima et al. ........................... 348/751 |

*Primary Examiner*—Georgia Epps
*Assistant Examiner*—Ricky Mack
*Attorney, Agent, or Firm*—Henneman & Saunders; Larry E. Henneman, Jr.

[57] ABSTRACT

A color separation and recombination system separates a beam of white light traveling along an optical axis into three differently colored light beams. The system then independently modulates each colored beam and recombines the colored beams to create a color image. The system includes a crossed pair of dichroic filters to separate the beam of white light and to recombine the modulated bundles. The system also includes a pair of aberration-compensating elements that equalize the optical thickness of glass through which each light bundle passes. This equalization of optical thickness equalizes the aberration induced into each bundle. In another embodiment the beam of white light is polarized before separation. The polarities of the colored light beams are then modulated using a spatial light modulator. An analyzer and half-wave plate are provided between the spatial light modulator and the crossed dichroic filters to pass only a portion of the modulated light. The half-wave plate ensures that the modulated light incident on the crossed dichroic filters is of the same polarity as the polarized white light separated by the crossed dichroic filters.

27 Claims, 2 Drawing Sheets

LIGHT SEPARATION AND RECOMBINATION SYSTEM FOR AN OFF-AXIS PROJECTOR

FIELD OF THE INVENTION

The present invention relates in general to image projectors, and in particular to systems for separating light into constituent colors and for recombining these colors.

BACKGROUND

FIG. 1 depicts a conventional projector 100, for projecting an image generated by, for example, a computer or television signal. Projector 100 includes an illumination path 110, a transmissive spatial light modulator (SLM) 120, and a projection path 130. These elements combine to project an image onto a surface 140. In operation, light source 112 shines an illuminating beam 114 (depicted as dashed lines) through collimating optics 116 and a polarizer 118 in illumination path 110 to impinge upon SLM 120.

SLM 120 is controlled by an image signal, and modulates the polarity of light corresponding to individual image pixels in the polarized beam. The modulated beam then passes to an analyzer 132, a polarizing filter oriented to pass only light of a selected polarity.

SLM 120 establishes the intensity of individual pixels by modulating the polarity of light corresponding to each pixel. SLM 120 represents a bright pixel by modulating the polarity of light representing that pixel to allow analyzer 132 to pass that light: SLM 120 represents a dark pixel by modulating the polarity of light representing that pixel to allow analyzer 132 to block that light. Intermediate degrees of polarity modulation offer intermediate levels of brightness. The analyzed beam then passes through projection optics 134 to a surface 140. Projector 100 thus projects an image specified using SLM 120 onto surface 140 (e.g., a wall).

Projector 100 suffers from considerable loss of light due to the presence of drive electronics (not shown) necessarily located at each pixel element of SLM 120. This deficiency has been addressed using reflective SLMs in which the drive electronics are grouped on one side of the light valve. A conventional reflective-SLM projector 200 is depicted in FIG. 2.

Projector 200 of FIG. 2 includes an illumination path 210, a reflective SLM 220, and a projection path 230. A light source 212 shines an illuminating beam 214 (depicted as dashed lines) through collimating optics 216 into a polarizing beam splitter 218. Beam splitter 210 polarizes illuminating beam 214 and reflects the polarized beam onto SLM 220. SLM 220 then modulates and reflects the polarized beam back through beam splitter 218, which analyzes the reflected beam using the same interface that initially polarized illuminating beam 214. The analyzed beam then passes through projection optics 234 to a surface 240. Projector 200 thus projects an image specified using SLM 220 onto surface 240 (e.g., a wall).

Using beam splitter 218 as both a polarizer and an analyzer does not allow optimum placement of the polarizer and analyzer, but instead requires a compromise. In addition, beam splitter 218, being relatively thick, and being required to act both as a polarizer and a beamsplitter results in a relatively expensive component.

In light of the foregoing deficiencies in the prior art, there is a need for a color separation and recombination system that reduces light loss, image distortion and enables the use of inexpensive thin film polarizers as the polarizing elements.

SUMMARY

The present invention is directed to a color separation and recombination system that reduces light loss and image distortion. A color separation and recombination system in accordance with an embodiment of the invention includes a pair of dichroic filters that separate a beam of white light into blue, green, and red light bundles. The system also includes a pair of aberration-compensating elements (e.g., back surface mirrors of a predetermined thickness) that equalize the optical thickness of glass through which each light bundle passes. As a consequence of the equalization of optical thicknesses, the aberration suffered by each bundle is approximately equal. This beneficially reduces image distortion and allows the light bundles to be recombined and then corrected as a group. As compared with individually correcting the aberrations of each light bundle, collective correction is relatively easy and inexpensive.

One embodiment of the invention includes a polarizer that polarizes the white light to P-type polarity before separation into colored light bundles. The colored light bundles are then modulated using a reflective SLM capable of selectively changing the polarization of the differently colored light bundles. Each of the modulated bundles is then reflected to a respective analyzer that passes only light of S-type polarization. In this case, the analyzers are polarizers, but those skilled in the art will understand that the term analyzer includes any device capable of detecting the modulation of a beam by an SLM. Three half-wave plates, one provided between each s-transmitting polarizer and the crossed dichroic filters, ensure that the modulated bundles incident on the crossed dichroic filters are of the same polarity as was the polarized white light separated by the crossed dichroic filters.

BRIEF DESCRIPTION OF THE FIGURES

These and other features, aspects, and advantages of the present invention will become better understood with regard to the following description, appended claims, and accompanying figures, where:

DETAILED DESCRIPTION

Figure 1:
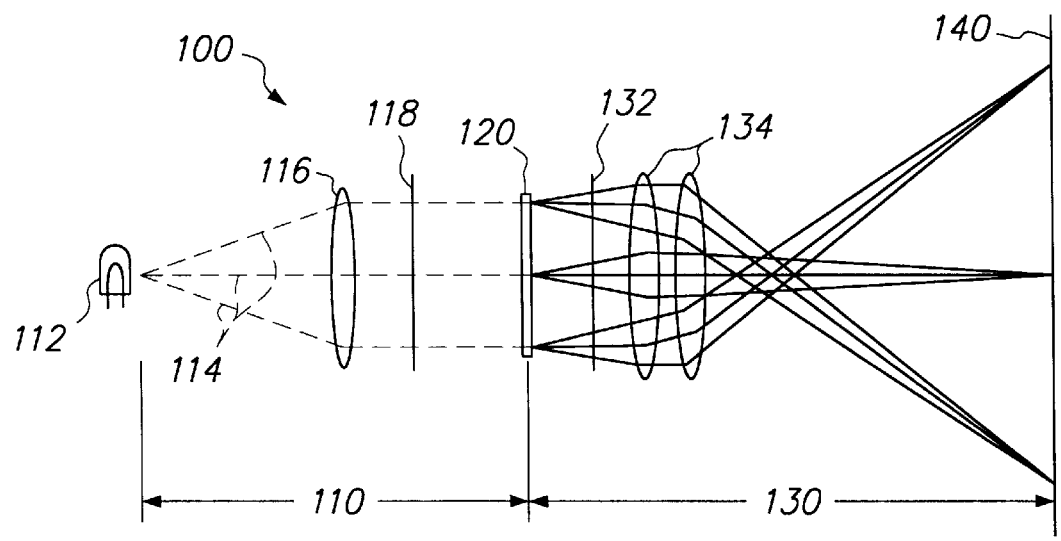
FIG. 1 depicts a conventional projector 100, which includes an illumination path 110, a transmissive spatial light modulator 120, and a projection path 130.
Figure 2:
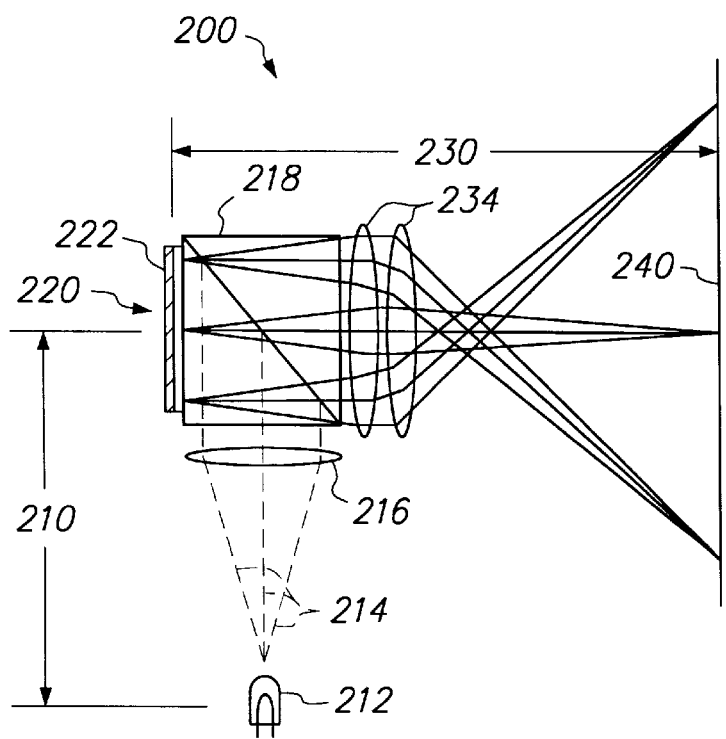
FIG. 2 depicts a conventional reflective-SLM projector 200.
Figure 3:
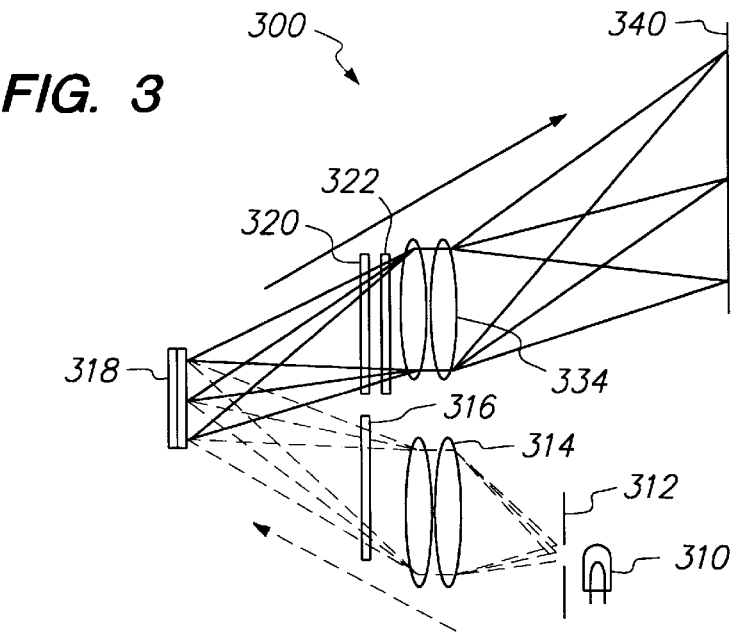
FIG. 3 depicts an off-axis projector 300 in accordance with the present invention.

FIG. 3 depicts an off-axis projector 300 in accordance with an embodiment of the present invention. Projector 300 includes a lamp 310 that shines white light along an illumination path (dashed line) through an aperture 312, a condenser lens 314, and a polarizer 316. Polarizer 316 is arranged so that P-polarized light in the illumination path impinges upon a reflective SLM 318.

SLM 318 reflects light from the illumination path along a projection path (solid lines). The projection path includes an analyzer 320, a half-wave plate 322, and projection optics 334. The projection path terminates at a selected surface 340, such as a wall or viewing screen, upon which is presented an image conventionally selected by SLM 318.

SLM 318 selectively changes the polarity of the P-polarized light from polarizer 316, responsive to an image signal. In one embodiment, SLM 318 is a uLCD (micro liquid crystal display) manufactured by sVision, Inc., of Santa Clara, Calif., as part no. 0400005. When operating in a "normally black" mode, SLM 318 reflects the P-polarized light without changing the polarization to depict dark pixels, and rotates the polarization from P polarization to S polarization to depict bright pixels. Different degrees of rotation are used to depict intermediate shades; the greater the S-polarized component of the reflected light, the brighter the pixel.

For illustrative purposes, consider a "dark" pixel in the foregoing normally-black-mode example. SLM 318 does not rotate the polarization of (retard) the portion of the P-polarized light bundle associated with the pixel. Consequently, the light reflected along the projection path from that pixel is also P-polarized. This reflected light is blocked by analyzer 320, which is oriented to pass only S-polarized light. Thus, projector 300 images a dark pixel when there is little or no retardation of the incident beam.

Projector 300 projects a bright pixel by signaling SLM 318 to rotate the polarization of the P-polarized incident light so that SLM 318 reflects S-polarized light along the projection path. This S-polarized light passes through analyzer 320 to impinge upon surface 340. In embodiments that include half-wave plate 322, the S-polarized light is rotated by half-wave plate to P polarization. The purpose of half-wave plate 322 is explained below in connection with FIG. 4.

Lamp 310 is, e.g., a Cermax™ 500 watt Xenon lamp available from ILC of Sunnyvale, Calif. Aperture 312 is a conventional input aperture having an aspect ratio matched to the aspect ratio of SLM 318. In one embodiment, the aspect ratios of SLM 318 and aperture 312 are each 4 to 3.

Condenser lens 314 is a conventional lens or system of lenses adapted to relay light from aperture 312 through polarizer 316 to the surface of SLM 318. The magnification level of condenser lens 314 is selected so that aperture 312 is magnified to approximately the same size as SLM 318. In one embodiment, the magnification of condenser lens 314 is selected to magnify aperture 312 to an area slightly larger than the face of SLM 318 to allow relaxed tolerances. The optical specifications for condenser lens 314 will vary depending on the particular application; the design specification for a particular application is readily obtainable by one of skill in the art.

Light from condenser lens 314 passes through polarizer 316 before impinging upon SLM 318. Polarizer 316 and analyzer 320 are, in one embodiment, fashioned from HN42HE polarizing material available from Polaroid Corporation. An acceptable example of half-wave plate 322 is available from Meadowlark Optics of Longmont, Colo. Of course, other polarizers, analyzers, and half-wave plates may be used, as will be apparent to those of skill in the art, and the term "analyzer" is understood in its broadest sense to include any device capable of detecting or filtering the modulation of a beam by an SLM.

As depicted in FIG. 3, analyzer 320 and polarizer 316 are parallel to one another and to the face of SLM 318. The illumination path and the projection path are at angles with respect to an imaginary line normal to the face of SLM 318. In one embodiment, the optical axes of the illumination and projection paths form a plane with the normal (i.e., in the plane of the page for FIG. 3). The angle formed by the surface normal and either optical axis is 12 degrees. Thus, the total angle separating the illumination and projection light bundles is 24°. This is depicted in FIG. 3, in which the illumination and projection paths are shown to impinge upon and reflect from SLM 318 at roughly equal angles, and where the illumination and projection paths lie in the same plane as the page along with an imaginary line normal to the face of SLM 318. The 12° angle was selected to allow sufficient space for half-wave plate 320 and to separate the illumination light bundles from the projection light bundles so that the two can be polarized and analyzed separately.

Figure 4:
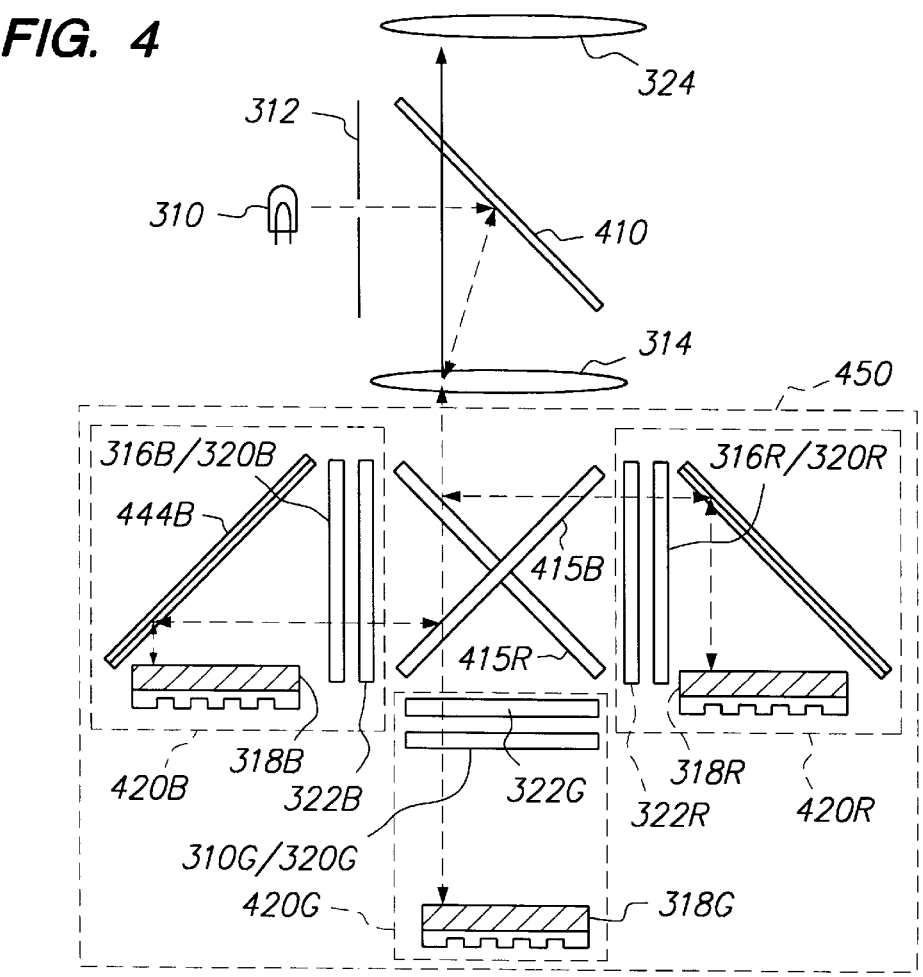
FIG. 4 is a top view of off-axis projector 300 of FIG. 3.

FIG. 4 is a top view of off-axis projector 300 of FIG. 3. However, where FIG. 3 depicts a single SLM 318, FIG. 4 depicts SLM 318 as a set of SLMs 318B, 318G, and 318R. For purposes of the present application, numeric designations ending with the letters B, G, and R indicate respective primary colors blue, green, and red. It is to be understood that blue, green, and red are illustrative; other colors may be combined to form images, as will be readily understood by those of skill in the art.

The back focal length of projector 300 (i.e., the distance between projection lens 324 and each SLM) is identical for each colored light bundle. The physical size of crossed dichroic filters 415R and 415B and the need to separate the illumination and projection beams for separate polarization and retardation require that the back focal length of projector 300 be large relative to the effective focal length of projection lens 324.

Lamp 310 and aperture 312 are as described in connection with FIG. 3. A mirror 410 is positioned to allow lamp 310 and aperture 312 to be offset from the illumination path. Mirror 410, a conventional cold mirror, reflects visible light and lets infrared (IR) and ultraviolet (UV) rays pass, thus directing IR and UV light out of the system. This beneficially reduces the amount of thermal energy incident on the remaining optical components. Such a cold mirror is available, for example, from Melles Griot of Irvine, Calif., as part number PN 03 MCS 007.

The visible light from mirror 410 passes through condenser lens 314 and is then separated into blue, green, and red components, or light bundles, by crossed dichroic filters 415B and 415R. Those skilled in the art will understand that the color components need not be monochromatic, and that each colored bundle contains light of various wavelengths. Dichroic filters 415B and 415R reflect blue and red light, respectively, and allow the remaining colors to pass. Thus, the blue component of the visible light from mirror 410 passes through dichroic filter 415R and is reflected by dichroic filter 415B into blue-channel optics 420B. Similarly, the red component of the visible light from mirror 410 passes through dichroic 415B and is reflected by dichroic 415R into red-channel optics 420R. The remaining (green) component of the visible light from mirror 410 passes through both of dichroic filters 415R and 415B into green-channel optics 420G.

In addition to separating the illumination beam into blue, green, and red bundles, dichroic filters 415B and 415R also recombine the blue, green, and red bundles after they are individually modulated in the respective blue-, green-, and red-channel optics 420B, 420G, and 420R. (This aspect of the invention is discussed below in detail.) Thus, the combination of dichroic filters and the optics for the three bundles are collectively referred to as a separation and recombination system 450. In other embodiments, a similar configuration could be used only for separation or only for recombination.

In one embodiment, dichroic filter 415B reflects wavelengths of from 400 to 500 nanometers, and dichroic filter 415R reflects wavelengths of from 600 to 690 nanometers.

The green component is thus the 500 to 600 nanometer band between the band widths of filters 415B and 415R. Dichroic filters 415B and 415R are three millimeters thick and are of BK7 glass. Of course, other thicknesses and other materials (e.g., fused silica) may be used, as will be readily apparent to those of skill in the art. One embodiment uses filters produced by OCA Applied Optics of Garden Grove, Calif., and may be produced using coatings produced by OCA Applied Optics under the Microplasma trademark.

The blue bundle received by blue-channel optics 420B passes below half-wave plate 322B (see FIG. 3) and through polarizer 316B. Polarizer 316B and analyzer 320B are depicted as a single element 316B/320B in FIG. 4 because, as shown in FIG. 3, polarizer 316 is directly above analyzer 320. Once through polarizer 316B, the P-polarized blue light reflects off of a back surface folding mirror 444B onto SLM 318B.

Mirror 444B includes a 1.5 millimeter glass substrate having a back surface coated with a reflective material, such as aluminum. Mirror 444B is arranged at 45° with respect to the incident blue bundle from dichroic filter 415B.

In the embodiment of FIG. 4, the thickness of mirror 444B is selected to be half the thickness of dichroic filter 415B. This advantageously induces aberrations, such as astigmatism and coma, that are nearly identical to aberrations induced by dichroic filter 415B into the green bundle that passes through both dichroic filters 415R and 415B. Mirror 444B is half as thick as dichroic mirror 415B because light reflected from the back surface of mirror 444B traverses the thickness of mirror 444B twice. Thus, the total amount of glass traversed is the same for light traveling through dichroic filter 415B as for light reflecting off of mirror 444B. Consequently, the total thickness of glass through which the blue light bundle passes is the same as the total thickness through which the green light bundle passes. This equivalence is important because it allows the aberrations introduced into the green and blue light bundles to be corrected after they are recombined. Without the corrective effect of mirror 444B, each of the blue and green light bundles would require independent correction, which is difficult to achieve.

Mirror 444B is 1.5 millimeter BK7 glass in the embodiment in which dichroic filter 415B is of three millimeter BK7 glass. Furthermore, dichroic filter 415B, as well as mirror 444B, could also be positioned at a different angle. For example, arranging mirror 444B at a shallower angle (i.e., where the angle of incidence relative to the surface normal of mirror 444B is less than 45°) can lessen polarization effects. However, the depicted 45° angle advantageously minimizes some types of distortion and simplifies packaging. Mirror 444B is preferably optimized for high reflectance of blue light in the bandwidth of interest.

Aberration can be matched using elements other than folding mirrors. For example, a single glass element of the same thickness as dichroic filter 415B could be placed perpendicular to the path of the blue light bundle between dichroic filter 415B and SLM 316B. Mirror 444B could then be removed or replaced with a front surface-reflecting mirror. Mirrors 444B and other elements that provide similar aberration compensation are referred to collectively as aberration-compensating elements.

The thicknesses of mirror 444B and dichroic filter 415B and the ratio of thickness between the two may be changed as required to equalize aberration induced into the colored light bundles. This may be necessary if the type of glass used for mirror 444B is different from that used for the dichroic filters, or if the selected aberration-compensating element is positioned at different angles. The appropriate thickness and angle of mirror 444B or other aberration-compensating element depends upon the aberration induced by the element. The important point is that the aberration induced into each color channel should be equal. The term "optical thickness" is intended to convey a particular thickness along an optical path that induces a selected aberration. Thus, matching the optical thicknesses of two elements includes selecting appropriate angles and materials to equalize the aberration induced by the elements.

Each of SLMs 318B, 318G, and 318R is preceded by a field lens (not shown) that conventionally redirects the optical axis of the colored light bundle so that the bundle passes through the entrance pupil of projection lens 324. SLMs 318B, 318G, and 318R independently modulate the blue, green, and red bundles of the illumination beam to create the desired projected image. The modulated beams reflected from the SLMs are then recombined in much the same way as they are separated. For example, mirror 444B reflects the modulated blue light from SLM 318B to analyzer 320B. As explained in connection with FIG. 3, analyzer 320B blocks P-polarized light and passes S-polarized light to half-wave plate 322B.

SLMs 318B, 318G, and 318R are, in one embodiment, monolithic, reflective LCDs (liquid crystal displays). Other SLMs may also be used, including correction plate, reflective, transmissive, and DLP, as will be understood by those of skill in the art. SLM Projector 300 would be configured differently for SLMs that modulate light without affecting polarity. However, such a projector could still take advantage of several aspects of the projector described herein.

Half-wave plate 322B changes the polarization of the modulated blue light from S polarization to P polarization before the modulated blue light impinges upon dichroic filter 415B. This is important because the bandwidth of dichroic filter 415B is slightly different for P-polarized light than for S-polarized light. It is also important that the illumination beam and reflected bundles strike filter 415B at the same angle of incidence. In the embodiment of FIG. 4, for example, the illumination beam and reflected blue bundle each strike filter 415B at the same angle but in opposite directions. Half-wave plate 322B is preferably color-corrected for the blue light bundle. (Half-wave plates 322G and 322R are similarly color corrected for the respective colors of interest.) Providing the same polarization and the same angle of incidence for both the illumination beam and the returning light bundles ensures that the bundles are recombined at the same wave lengths that they were separated.

Red-channel optics 420R work as described above in connection with blue-channel optics 420B. An explanation of red-channel optics 420R is therefore omitted for brevity. Green-channel optics 420G is similar to blue- and red-channel optics 420B and 420R, but does not include a mirror. The green light bundle passes through the same amount of glass, and therefore includes a similar degree of aberration, as the blue and red bundles.

As shown in FIG. 4, the crossed dichroic filters 415R and 415B combine the modulated blue, green, and red light bundles. The combined bundles are then transmitted over mirror 410 (see FIG. 3) and through projection optics 334. Projection optics 334 can be conventionally designed to correct for the similar aberrations in all three (red, green, and blue) light bundles.

Filters 415R and 415B are positioned near the entrance pupil of projector 300 so that the slight shadow produced by the juncture is not apparent in the projected image. That is, the obscuration produced by the juncture is spread evenly across the image. The entrance pupil may be appropriately placed in projector 300 by those skilled in the art.

The intense light incident on the various components of projector 300 generates a substantial amount of heat. The SLMs, polarizer, and analyzers, are therefore provided with heat sinks, typically attached to the mounts for these devices. A fan is also provided, and air moves freely within projector 300 to vent heat.

While the present invention has been described in connection with specific embodiments, variations of these embodiments will be obvious to those of ordinary skill in the art. For example, dichroic filters 415R and 415B need not be oriented in an X configuration, but may instead be separated. Furthermore, the glass of mirrors 444B and 444R may be wedge-shaped to provide better aberration correction. Therefore, the spirit and scope of the appended claims should not be limited to the foregoing description.

What is claimed is:

1. A color separation system configured to separate a beam of white light traveling along an optical axis into first, second, and third components having respective first, second, and third colors, the system comprising:
    a first dichroic filter positioned along the optical axis and having a first optical thickness, the first dichroic filter adapted to reflect the first component along a first path not parallel to the optical axis and to pass the second and third components;
    a second dichroic filter positioned along the optical axis and having a second optical thickness, the second dichroic filter adapted to reflect the second component along a second path not parallel to the optical axis and to pass the first and third components;
    a first aberration-compensating element positioned in the first path, the first aberration-compensating element having a third optical thickness equal to the second optical thickness; and
    a second aberration-compensating element positioned in the second path, the second aberration-compensating element having a fourth optical thickness equal to the first optical thickness.

2. The system of claim 1, wherein at least one of the first and second aberration-compensating elements is a mirror comprising a transparent plate having a thickness one half the first optical thickness.

3. The system of claim 1, further comprising a light modulator positioned along the first path, the light modulator configured to receive and modulate the first component.

4. The system of claim 3, further comprising a second light modulator positioned along the second path, the second light modulator configured to receive and modulate the second component.

5. The system of claim 4, further comprising a third light modulator positioned along the optical axis after the first and second dichroic filters, the third light modulator configured to receive and modulate the third component.

6. The system of claim 5, wherein the first-mentioned, second, and third light modulators comprise liquid crystal.

7. The system of claim 5, wherein the first-mentioned, second, and third light modulators comprise respective first, second, and third reflective surfaces adapted to reflect the first, second, and third components.

8. The system of claim 1, wherein the first and second dichroic filters intersect.

9. The system of claim 1, further comprising a polarizer disposed in the optical path and an analyzer disposed in a projection path.

10. The system of claim 9, further comprising a half-wave plate positioned in the projection path between the analyzer and the first dichroic filter.

11. An image projector comprising:
    a light source;
    a polarizer;
    a collimating lens disposed between the light source and the polarizer, the collimating lens configured to collimate light from the light source and to shine the collimated light through the polarizer;
    a light modulator positioned to receive the collimated light from the polarizer along an illumination path, the light valve positioned to pass the collimated light;
    a reflective surface configured to receive the collimated light from the light valve and to reflect the collimated light back through the light valve along a projection path not parallel to the illumination path;
    an analyzer positioned along the projection path to receive and analyze the reflected collimated light from the light valve;
    a dichroic filter positioned along the projection path to receive the reflected and analyzed collimated light; and
    a half-wave plate disposed between the analyzer and the dichroic filter.

12. The projector of claim 11, wherein the light valve comprises a transmissive liquid crystal material.

13. The projector of claim 11, wherein the polarizer is a linear polarizer.

14. The projector of claim 11, wherein the analyzer is a linear polarizer.

15. A color separation system for a projector, the system comprising:
    a light source producing visible light and shining the light along an illumination path;
    a polarizer positioned in the illumination path to receive and polarize the light from the light source to provide polarized light of a first polarization;
    a reflective surface configured to receive the polarized light from the polarizer and to reflect the light along a projection path not parallel to the illumination path;
    an analyzer positioned along the projection path to receive and analyze the reflected light from the analyzer, wherein the analyzer is configured to pass reflected light of a second polarization; and
    a half-wave plate positioned along the projection path and configured to change the polarization of the light from the analyzer to the first polarization.

16. The system of claim 15, wherein the first polarization is P-type and the second polarization is S-type.

17. The system of claim 15, further comprising a color separator configured to separate the polarized light from the polarizer.

18. The system of claim 17, wherein the color separator is configured to receive the light from the half-wave plate for recombination.

19. A method of projecting an image onto a display surface, the method comprising:
    directing a beam of light along an illumination path;
    separating the beam into a plurality of different colored beams;
    polarizing each of the colored beams;
    modulating the polarities of selected portions of each of the colored beams;
    reflecting the modulated colored beams along a projection path not parallel to said illumination path;

analyzing the modulated colored beams; and recombining the analyzed colored beams.

20. A method of projecting an image onto a display surface, the method comprising:

directing a beam of light along an illumination path;

separating the beam into a plurality of different colored beams;

polarizing each of the colored beams;

modulating the polarities of selected portions of each of the colored beams;

analyzing the modulated colored beams;

rotating the polarity of at least one of the colored beams; and recombining the analyzed colored beams.

21. A color separation and recombination system comprising:

a light source for emitting a beam of visible light;

means for separating the beam into a plurality of different colored beams;

means for polarizing each of the colored beams;

means for modulating the polarities of selected portions of each of the colored beams;

means for analyzing the modulated colored beams; and means for recombining the analyzed colored beams.

22. A color separation of recombination system according to claim 21, further comprising means for rotating the polarity of the analyzed colored beams.

23. A color separation and recombination system according to claim 21, wherein the means for analyzing the modulated colored beams is a polarizer.

24. An image projector comprising:

a light source;

a color separator;

a reflective light modulator disposed to receive light along a first direction and to reflect the modulated light along a second direction not parallel to said first direction; and a polarizer disposed between said color separator and said reflective light modulator.

25. The image projector of claim 24, further comprising an analyzer disposed to receive modulated light reflected from said reflective light modulator.

26. The image projector of claim 25, wherein said polarizer and said analyzer are separate from one another.

27. The image projector of claim 26, wherein said polarizer and said analyzer each comprise linear polarizers.

* * * * *